United States Patent
Coyle et al.

(10) Patent No.: US 6,536,230 B2
(45) Date of Patent: Mar. 25, 2003

(54) A/D BAFFLE FOR GAS PRESSURE PULSATION REDUCTION

(75) Inventors: Brian J. Coyle, Orchard Park, NY (US); Prasad Shripad Kadle, East Amherst, NY (US); John Barrett, Cheektowaga, NY (US); John Paul Telesz, East Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/767,091

(22) Filed: Jan. 22, 2001

(65) Prior Publication Data

US 2002/0095949 A1 Jul. 25, 2002

(51) Int. Cl.[7] ............................ F25B 43/00; B01D 53/02
(52) U.S. Cl. ............................ 62/503; 62/475; 96/139; 96/152
(58) Field of Search .............................. 62/503, 470, 471, 62/474, 475, 468, 512, 500; 29/902; 210/282, 285, DIG. 6; 96/139, 152

(56) References Cited

U.S. PATENT DOCUMENTS

| | | | |
|---|---|---|---|
| 4,474,035 A | 10/1984 | Amin et al. | 62/503 |
| 4,611,750 A | 9/1986 | Kish | 228/184 |
| 4,994,185 A | 2/1991 | Cullen et al. | 210/282 |
| 5,036,972 A | 8/1991 | Cullen et al. | 206/204 |
| 5,201,195 A | 4/1993 | Gavlak et al. | 62/475 |
| 5,419,157 A | * 5/1995 | Kiblawi et al. | 62/503 |
| 5,787,728 A | * 8/1998 | Das et al. | 62/503 |
| 6,026,655 A | * 2/2000 | Griffin et al. | 62/503 |
| 6,363,742 B1 | * 4/2002 | Brezuleanu et al. | 62/503 |

FOREIGN PATENT DOCUMENTS

| | | |
|---|---|---|
| EP | 1046872 | 10/2000 |
| EP | 1059496 | 12/2000 |
| FR | 2690980 | 11/1993 |

* cited by examiner

Primary Examiner—Chen-Wen Jiang
(74) Attorney, Agent, or Firm—Patrick M. Griffin

(57) ABSTRACT

An accumulator-dehydrator assembly for use in an air conditioning system including an evaporator and a compressor. The accumulator-dehydrator assembly also includes a canister with an upper portion, an inlet, an outlet and a delivery tube with a first tube end positioned in the upper portion of the canister and a second tube end connected to the outlet. A baffle is disposed within the canister that includes a first end connected to the canister and a second end positioned to define a partition between the first tube end of the delivery tube and the inlet. The purpose of the baffle is to reduce pulsations that result from pressure fluctuations in the air-conditioning system.

18 Claims, 4 Drawing Sheets

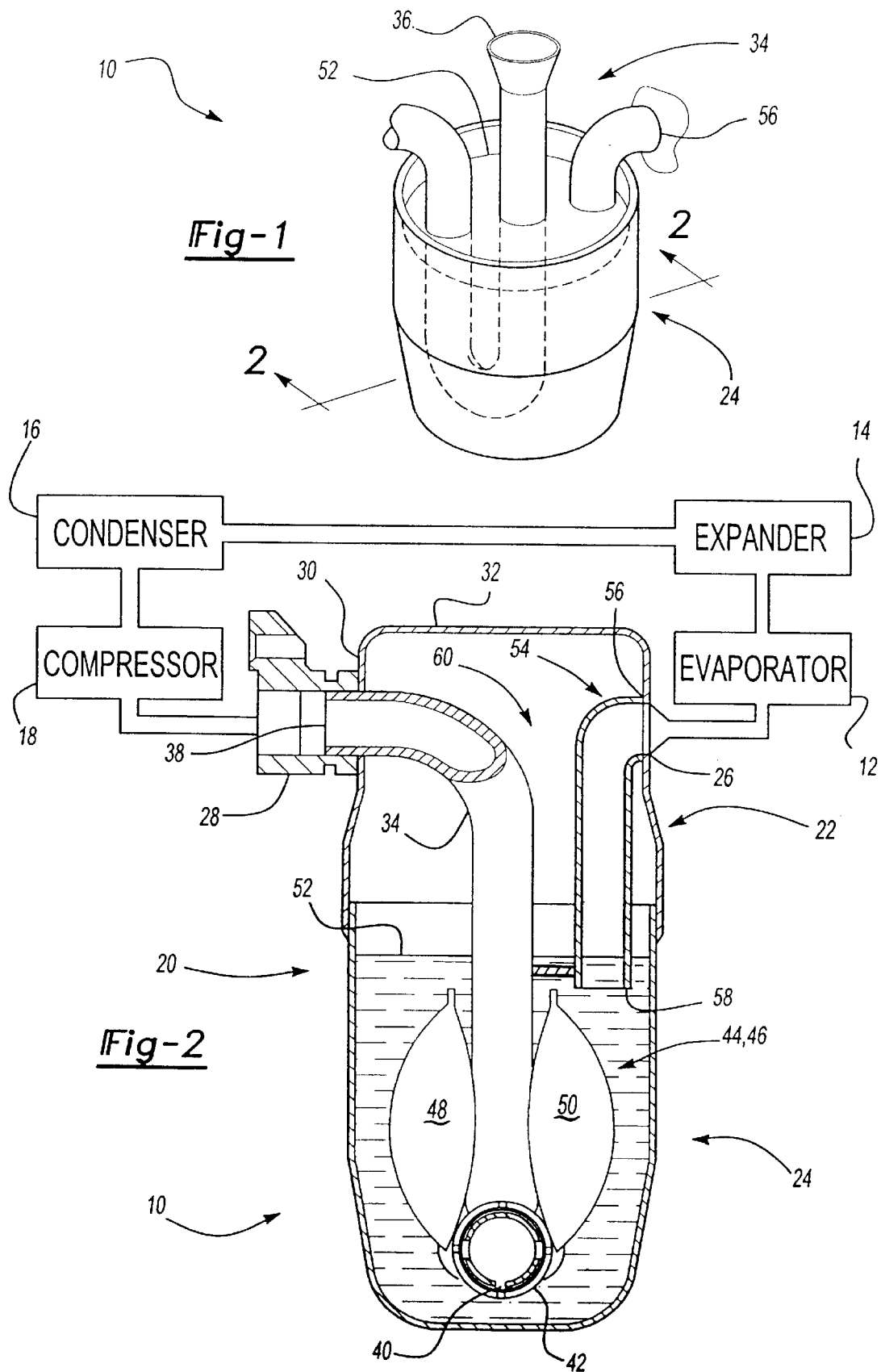

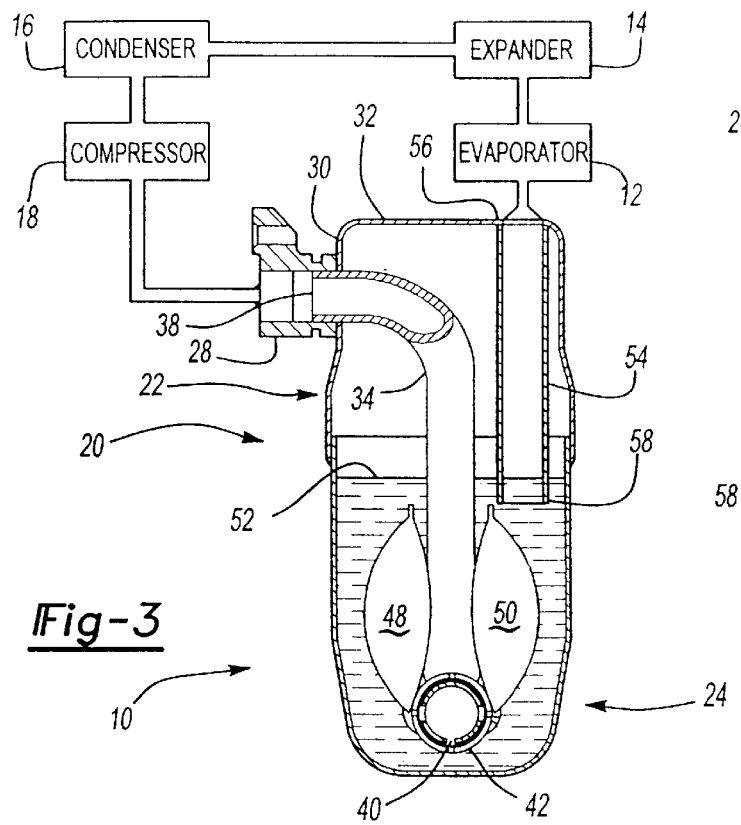
Fig-3
Fig-4
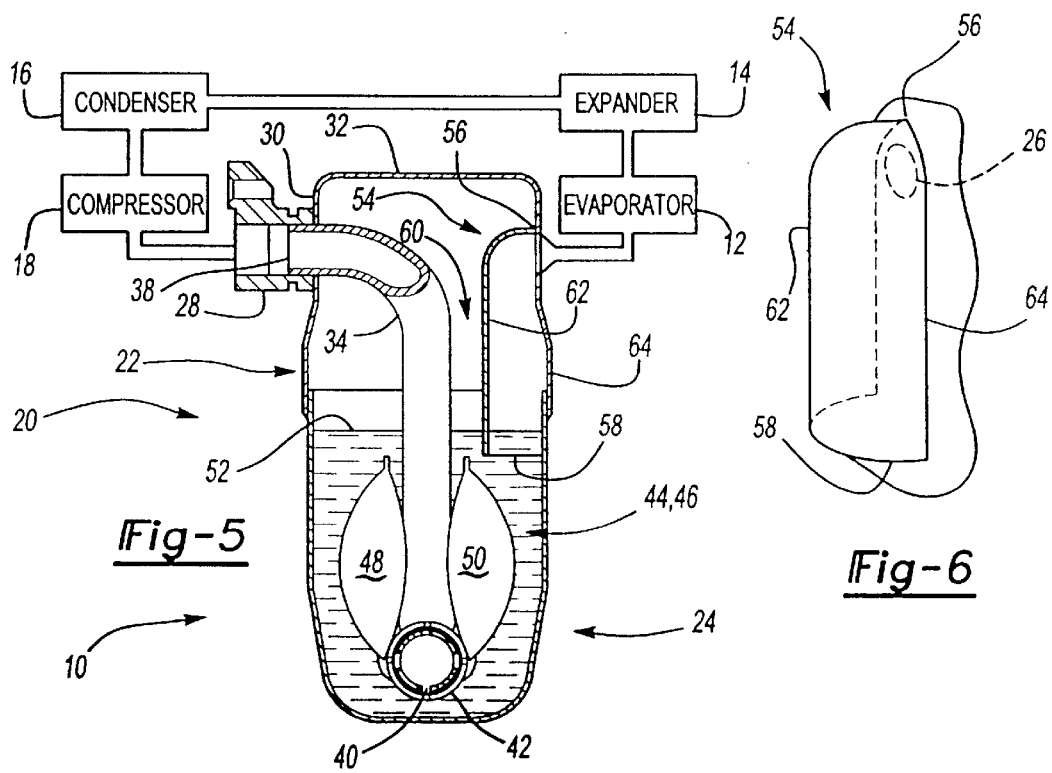
Fig-5
Fig-6

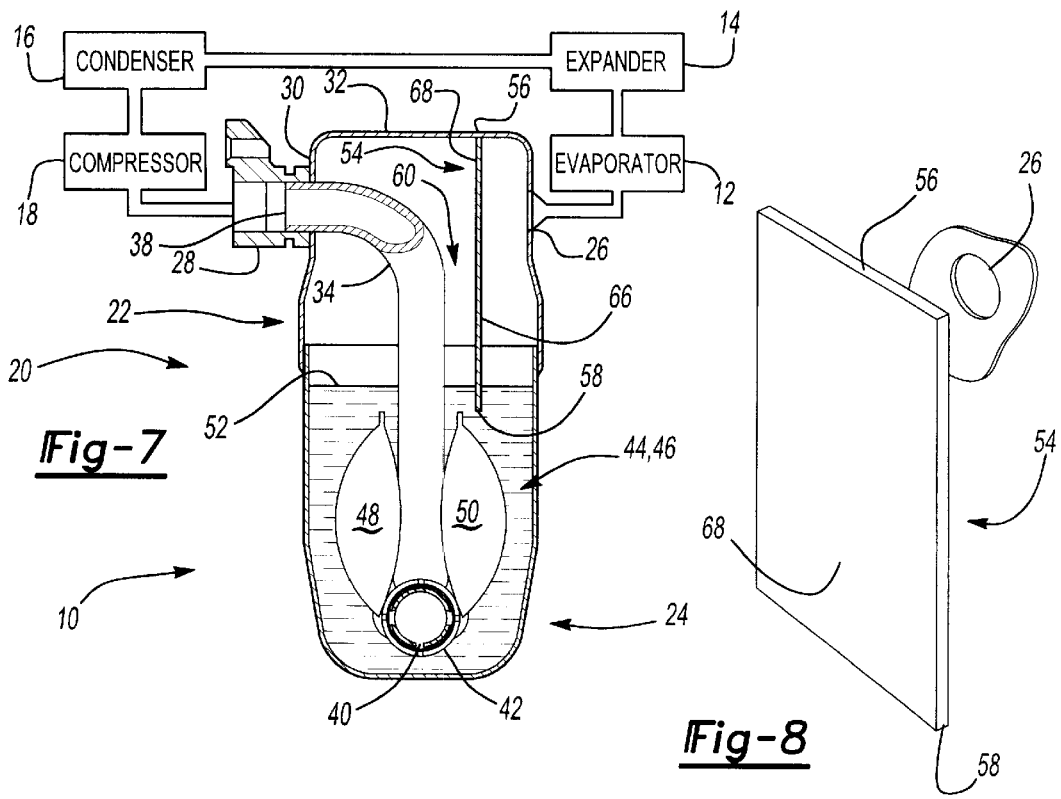
*Fig-7*
*Fig-8*
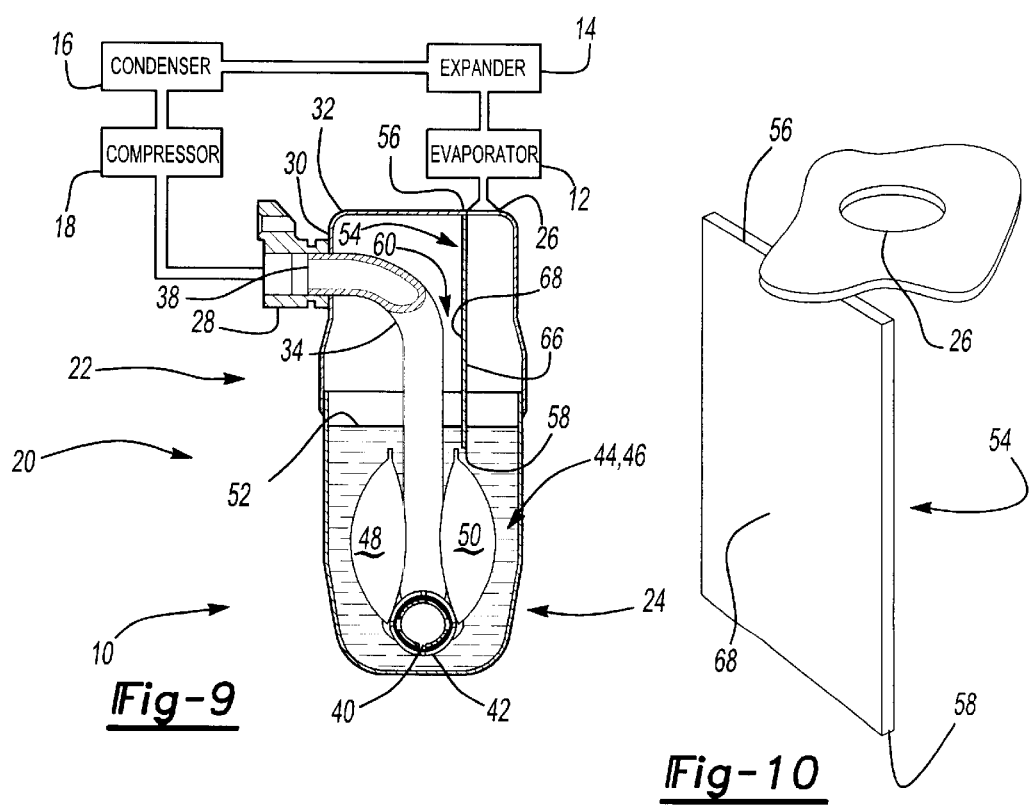
*Fig-9*
*Fig-10*

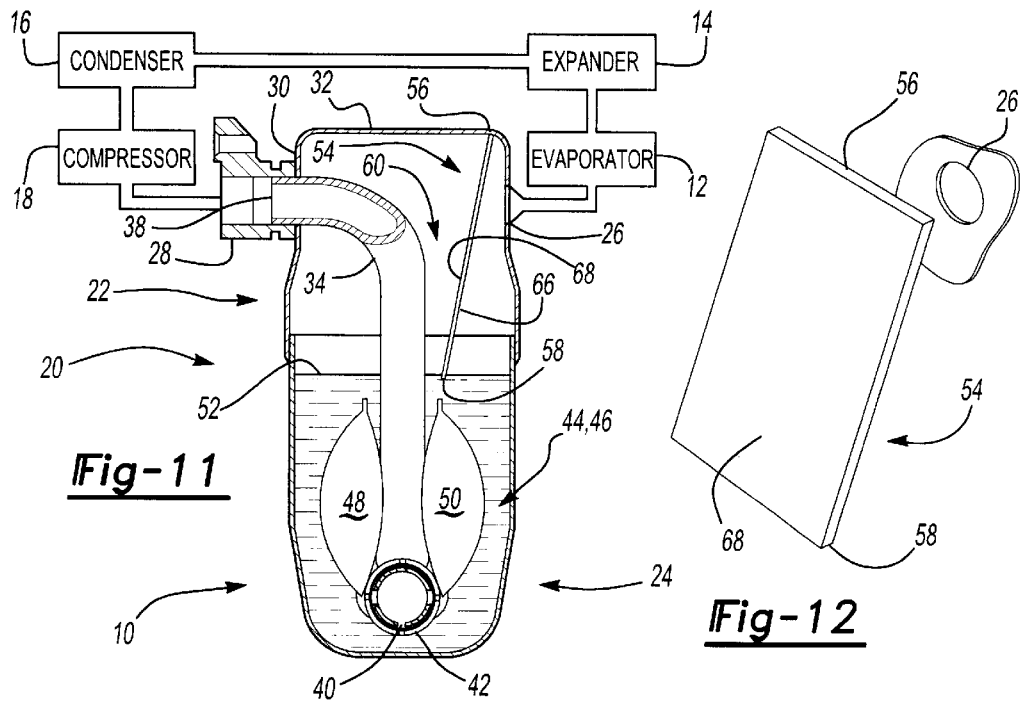
*Fig-11*
*Fig-12*
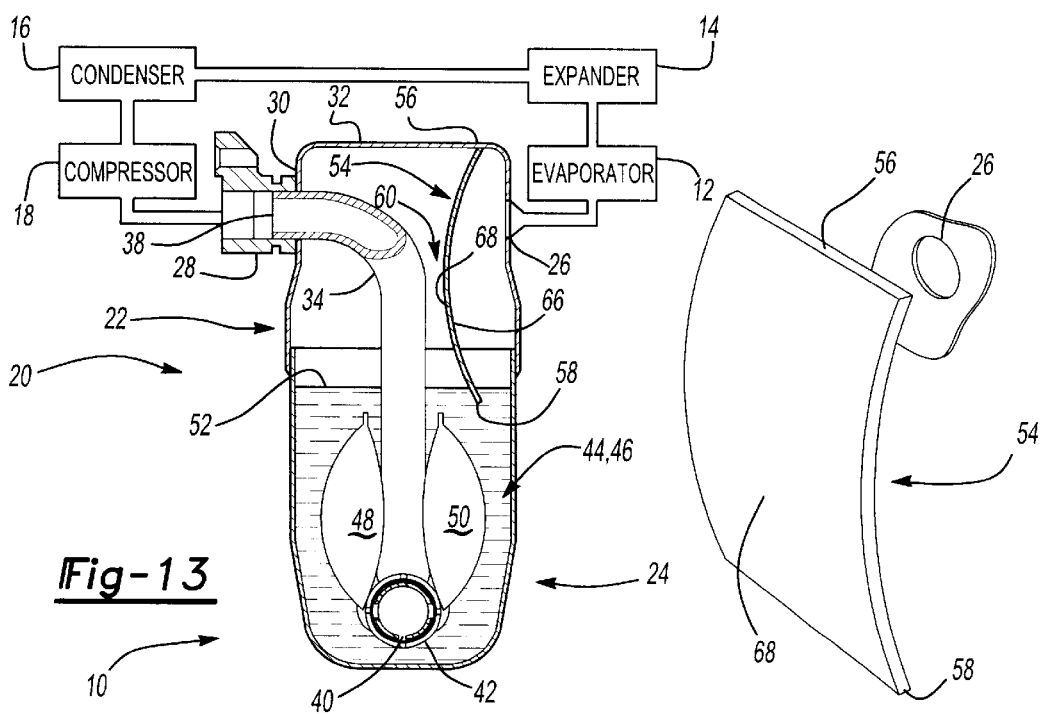
*Fig-13*
*Fig-14*

A/D BAFFLE FOR GAS PRESSURE PULSATION REDUCTION

BACKGROUND OF THE INVENTION

1. Field of the Invention

The present invention relates to an accumulator-dehydrator assembly for use in an air conditioning system.

2. Description of the Prior Art

Vehicle air conditioning systems include a compressor that compresses and superheats refrigerant. The refrigerant exits the compressor and continues first to a condenser and then to an expander. From the expander, the refrigerant enters an evaporator and then returns to the compressor to begin the cycle again. Disposed between the evaporator and compressor is an accumulator-dehydrator assembly which is designed to accomplish several objectives.

The accumulator-dehydrator primarily receives and accumulates the evaporator output which comprises both a liquid component and a vapor component. The accumulator-dehydrator serves as a separator in which fluid collects at the bottom of the canister and vapor at the top.

Typically, an accumulator-dehydrator assembly for use in an air conditioning system includes a canister having an upper portion for containing vaporized refrigerant and a lower portion for containing liquid refrigerant. Mounted to the canister is an inlet to transfer refrigerant from the evaporator to the canister. An outlet is also mounted to the canister to transfer vaporized refrigerant to the compressor from the canister. A delivery tube is positioned within the canister with a first tube end in fluid communication with the upper portion of the canister to receive the vaporized refrigerant and a second tube end is connected to the outlet to deliver vaporized refrigerant to the compressor. The delivery tube extends down from the outlet to near the bottom of the canister and then turns upward and extends to near the top of the canister. An oil pickup is connected to the delivery tube to deliver oil to the delivery tube. The oil is entrained in the vapor refrigerant and delivered to the compressor to ensure the smooth performance of the compressor and to prolong the life of the compressor. The features discussed above are disclosed in U.S. Pat. No. 4,496,378 to Kish.

A common problem with accumulator-dehydrator assemblies is noise associated with pulsations that result from pressure fluctuations in the system. Pulsations originate in the compressor, run backwards through the system to the canister, enter the canister from the first tube end of the delivery tube, and exit to the evaporator through the inlet. In a vehicle with an air conditioning system, the result is additional noise caused by the pulsations being heard in the passenger compartment. In the prior art, the pulsations have several pathways in which to exit through the inlet of the canister into the evaporator and create noise. The disadvantage of the prior art, therefore, is the inability to significantly reduce the movement of these pulsations through the air conditioning system.

SUMMARY OF THE INVENTION AND ADVANTAGES

The present invention is an accumulator-dehydrator assembly for use in an air conditioning system having an evaporator and a compressor. The assembly includes a canister with an upper portion for containing vaporized refrigerant and a lower portion for containing liquid refrigerant. An inlet is mounted to the canister to transfer refrigerant from the evaporator to the canister and an outlet is mounted to the canister to transfer vaporized refrigerant to the compressor from the canister. The assembly incorporates a delivery tube, also known as a J-tube or U-tube, with a first tube end positioned in the upper portion of the canister to receive the vaporized refrigerant and a second tube end is connected to the outlet to deliver the vaporized refrigerant to the compressor. A baffle is disposed within the canister. The baffle has a first end connected to the canister and a second end positioned to define a partition between the first tube end of the delivery tube and the inlet. In one object of the invention, the baffle is further defined by being extended across the inlet and substantially surrounding the inlet. In another object of the invention, the baffle is extended into the lower portion of the canister and partially submerged by the liquid refrigerant.

The advantage of the present invention over the prior art is the ability to considerably reduce the pulsations typically associated with pressure systems. The present invention forces the pulsations into the liquid refrigerant prior to exiting through the inlet into the evaporator. This significantly reduces the pulsations entering the evaporator and thus, reduces the noise.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of the lower portion of the canister showing the general position of the delivery tube and the baffle in the shape of a tube;

FIG. 2 is a vertical cross-section of the full assembly, like FIG. 2, but showing the baffle in the shape of a tube extending from the inlet in the side of the canister;

FIG. 3 is a cross-section of the full assembly like FIG. 2, but showing the baffle tube extending from the inlet in the top of the canister;

FIG. 4 is a partial perspective view showing the spatial relationship between the baffle and the inlet shown in FIG. 3;

FIG. 5 is a cross-section of the full assembly like FIG. 2, but showing the baffle in the shape of a shell and substantially covering the inlet in the side wall of the canister;

FIG. 6 is a partial perspective view showing the spatial relationship between the baffle and the inlet shown in FIG. 5;

FIG. 7 is a cross-section of the full assembly similar to FIG. 2, but showing the baffle in the shape of a panel and extending across an inlet in the side wall of the canister;

FIG. 8 is a partial perspective view showing the spatial relationship between the baffle and the inlet shown in FIG. 7;

FIG. 9 is a cross-section of the full assembly similar to FIG. 2, but showing the baffle in the shape of a panel extending from the inlet in the top of the canister;

FIG. 10 is a partial perspective view showing the spatial relationship between the baffle and the inlet shown in FIG. 9;

FIG. 11 is a cross-section of the full assembly similar to FIG. 2, but showing the baffle in the shape of a panel positioned at an acute angle relative to the side wall of the canister;

FIG. 12 is a partial perspective view showing the spatial relationship between the baffle and the inlet shown in FIG. 11;

FIG. 13 is a cross-section of the full assembly similar to FIG. 2, but showing the baffle in the shape of an arcuate panel; and FIG. 14 is a partial perspective view showing the spatial relationship between the baffle and the inlet shown in FIG. 13.

DETAILED DESCRIPTION OF THE PREFERRED EMBODIMENT

Referring to the Figures, wherein like numerals indicate like or corresponding parts throughout the several views, an accumulator-dehydrator assembly for use in an air conditioning system is generally shown at 10. The air conditioning system includes an evaporator 12, an expander 14, a condenser 16 and a compressor 18.

The preferred embodiment of the accumulator-dehydrator assembly 10 further includes a canister 20 with an upper portion 22 for containing vaporized refrigerant and a lower portion 24 for containing liquid refrigerant and oil. An inlet 26 is mounted to the canister 20 to transfer refrigerant from the evaporator 12 to the canister 20 and an outlet 28 is mounted to the canister 20 to transfer vaporized refrigerant to the compressor 18 from the canister 20. The inlet 26 may be connected to a side wall 30 of the canister 20 or connected to a top side 32 of the canister 20.

The assembly incorporates a delivery tube 34, also known as a J-tube or U-tube, with a first tube end 36 positioned in the upper portion 22 of the canister 20 to receive the vaporized refrigerant and a second tube end 38 is connected to the outlet 28 to deliver the vaporized refrigerant to the compressor 18. FIG. 1 shows the general configuration of the delivery tube 34. An oil pickup 40 is connected to the delivery tube 34 and is in operative communication with the delivery tube 34 to transfer liquid oil from the lower portion 24 of the canister 20 to the outlet 28. The liquid oil is required to lubricate the compressor 18 to extend the life of the compressor 18. In addition, a filter 42 is connected to the delivery tube 34 to filter the liquid oil prior to entering the oil pickup 40. The assembly 10 further includes a dewatering device 44 that is connected to the delivery tube 34 to remove water from within the canister 20. In the embodiments discussed herein, the dewatering device 44 is a porous container 46 having a first half 48 and a second half 50, each filled with desiccant. A service port, not shown, can also be connected to the canister 20.

A baffle 54 is positioned within the canister 20. The baffle 54 has a first end 56 connected to the canister 20 and a second end 58 positioned to define a partition 60 between the first tube end 36 of the delivery tube 34 and the inlet 26. The baffle 54 can be formed from metal or plastic and the first end 56 can be connected to the canister using several methods including being welded, brazed, integrally formed, glued, snapped-in, etc. The purpose of the baffle 54 is to reduce pulsations of refrigerant entering the inlet 26 from the first tube end 36 of the delivery tube 34. The second end 58 of the baffle 54 can be mounted to the delivery tube 34 to increase rigidity of the baffle 54.

In the preferred embodiment, shown in FIG. 2, the baffle 54 is in the shape of a tube and the first end 56 is connected to the canister 20 about the inlet 26. The second end 58 of the baffle 54 extends into the lower portion 24 of the canister 20 to an opening submerged in the liquid refrigerant. The liquid level is shown at 52. The liquid level 52 represents a liquid operating level. The purpose of positioning the second end 58 of the baffle 54 in the liquid refrigerant is to reduce pulsations from entering the inlet 26 from the first tube end 36 of the delivery tube 34. The pulsations are typically associated with pressure systems and can create additional noise in the passenger compartment of a vehicle with an air conditioning system. The noise is reduced by forcing the pulsations under the baffle 54 and into the liquid prior to exiting out the inlet 26. The baffle 54 may be used for canisters 20 where the inlet 26 is positioned in the side wall 30 of the canister 20, as shown in FIGS. 1 and 2, or where the inlet is positioned in the top side 32 of the canister 20, as shown in FIGS. 3 and 4.

The embodiment of FIGS. 5 and 6 includes every feature of the previous embodiment, the difference being that the baffle 54 is in the shape of a shell substantially surrounding the inlet 26 and including a front wall 62 and a back edge 64 wherein the back edge 64 engages the canister 20. Again, the second end 58 of the baffle 54 is extended into the lower portion 24 of the canister 20 and is partially submerged in the liquid refrigerant.

The third embodiment of the present invention, as shown in FIGS. 7–14, also includes all of the features of the previous embodiments, except, the baffle 54 in the third embodiment is in the shape of a panel and further includes a first side 66 that faces the inlet and a second side 68 that faces the delivery tube 34. The second end 58 of the baffle 54 is extended into the lower portion 24 of the canister 20 and is partially submerged in the liquid refrigerant. Furthermore, the baffle 54 is positioned parallel to the side wall 30 of the canister 20. The baffle 54, however, may also be positioned at an acute angle relative to the side wall 30 of the canister 20, as shown in FIGS. 11 and 12, or the baffle 54 may be arcuate in shape, as shown in FIGS. 13 and 14.

The baffle 54 in the third embodiment may be used for canisters 20 in which the inlet 26 is positioned in the top side 32 of the canister 20, referring to FIGS. 9 and 10, or in a side wall 30 of the canister 20, referring to FIGS. 7 and 8.

Additionally, it may be desirable in all embodiments to position the second end 58 of the baffle 54 adjacent to the porous container 46 filled with desiccant. The intent being to further reduce the pulsations from entering the inlet 26 from the first tube end 36 of the delivery tube 34 by forcing the pulsations through the porous container 46 and desiccant.

Obviously, many modifications and variations of the present invention are possible in light of the above teachings. The invention may be practiced otherwise than as specifically described within the scope of the appended claims.

What is claimed is:

1. An accumulator-dehydrator assembly for use in an air conditioning system having an evaporator and a compressor, said assembly comprising;

a canister defining an inlet and an outlet and having an upper portion for containing vaporized refrigerant and a lower portion, liquid refrigerant stored in said lower portion at a liquid operating level, a delivery tube having a first tube end in fluid communication with said upper portion of said canister for receiving the vaporized refrigerant and a second tube end at said outlet for delivering the vaporized refrigerant to the compressor, and a baffle having a first end connected to said canister and a second end extending below said liquid operating level to an opening below said liquid operating level and closed to fluid passage therethrough between said first end of said baffle and said opening to reduce pulsations of refrigerant entering said inlet from said first tube end of said delivery tube by forcing the pulsations through said liquid refrigerant prior to entering said opening.

2. An assembly as set forth in claim 1 wherein said baffle further includes a front wall and a back edge, said back edge engaging said canister.

3. An assembly as set forth in claim 1 further including a dewatering device connected to said delivery tube for removing water from within said canister.

4. An assembly as set forth in claim 3 wherein said second end of said baffle is disposed adjacent to said dewatering device and is partially submerged in the liquid refrigerant to reduce pulsations of refrigerant entering said inlet from said first tube end of said delivery tube.

5. An assembly as set forth in claim 3 wherein said dewatering device is a container having a first half filled with desiccant and a second half filled with desiccant, said container being porous to allow the liquid refrigerant to pass through the container.

6. An assembly as set forth in claim 3 further including an oil pickup connected to said delivery tube and in operative communication with said delivery tube for transferring liquid oil from said lower portion of said canister to said outlet.

7. An assembly as set forth in claim 6 further including a filter connected to said delivery tube for filtering the liquid oil prior to entering said oil pickup.

8. An accumulator-dehydrator assembly for use in an air conditioning system having an evaporator and a compressor, said assembly comprising;

a canister defining an inlet and an outlet and having an upper portion for containing vaporized refrigerant and a lower portion for storing liquid refrigerant;

a delivery tube having a first tube end in fluid communication with said upper portion of said canister for receiving the vaporized refrigerant and a second tube end at said outlet for delivering the vaporized refrigerant to the compressor; and a baffle having a first end connected to said canister and a second end for extending into the liquid refrigerant wherein said second end of said baffle is mounted to said delivery tube and said baffle defines a partition between said first tube end of said delivery tube and said inlet to reduce pulsations of refrigerant entering said inlet from said first tube end of said delivery tube.

9. An accumulator-dehydrator assembly for use in an air conditioning system having an evaporator and a compressor, said assembly comprising;

a canister defining an inlet and an outlet and having an upper portion for containing vaporized refrigerant and a lower portion for containing liquid refrigerant, a delivery tube having a first tube end in fluid communication with said upper portion of said canister for receiving vaporized refrigerant and a second tube end at said outlet for delivering the vaporized refrigerant to the compressor, and a baffle in the shape of a panel having a first end connected to said canister and a second end for extending into the liquid refrigerant to define an opening below the liquid refrigerant and for closing fluid passage therethrough between said first end of said baffle and said opening to reduce pulsations of refrigerant entering said inlet from said first tube end of said delivery tube.

10. An assembly as set forth in claim 9 wherein said baffle is arcuate in shape between said first end and said second end.

11. An assembly as set forth in claim 9 further including a dewatering device connected to said delivery tube for removing water from within said canister.

12. An assembly as set forth in claim 11 wherein said second end of said baffle is disposed adjacent to said dewatering device and is partially submerged in the liquid refrigerant to reduce pulsations of refrigerant entering said inlet from said first tube end of said delivery tube.

13. An assembly as set forth in claim 11 wherein said dewatering device is a container having a first half filled with desiccant and a second half filled with desiccant, said container being porous to allow the liquid refrigerant to pass through the container.

14. An assembly as set forth in claim 11 further including an oil pickup connected to said delivery tube and in operative communication with said delivery tube for transferring liquid oil from said lower portion of said canister to said outlet.

15. An assembly as set forth in claim 14 further including a filter connected to said delivery tube for filtering the liquid oil prior to entering said oil pickup.

16. An accumulator-dehydrator assembly for use in an air conditioning system having an evaporator and a compressor, said assembly comprising;

a canister defining an inlet and an outlet and having a sidewall, an upper portion for containing vaporized refrigerant, and a lower portion for containing liquid refrigerant;

a delivery tube having a first tube end in fluid communication with said upper portion of said canister for receiving vaporized refrigerant and a second tube end at said outlet for delivering the vaporized refrigerant to the compressor; and a baffle having a first end connected to said canister and a second end extending into said lower portion of said canister for partially submerging said baffle in the liquid refrigerant, said baffle being positioned at an acute angle to a plane parallel to said side wall of said canister and defining a partition between said first tube end of said delivery tube and said inlet to reduce pulsations of refrigerant entering said inlet from said first tube end of said delivery tube.

17. A method of operating an accumulator-dehydrator assembly having a canister defining an inlet for receiving refrigerant from an evaporator and a delivery tube having a first tube end within the canister for delivering vapor from within the canister to a compressor, said method comprising the steps of:

filling the canister with liquid refrigerant to a liquid operating level below the first tube end, and forcing pulsations from the first tube end through the liquid refrigerant prior to exiting through the inlet.

18. A method as set forth in claim 17 wherein said step of forcing pulsations through the liquid refrigerant is further defined as establishing a closed fluid path between the inlet and an opening below the liquid operating level to confine the flow of refrigerant from the inlet to the opening below the liquid operating level in the canister.

* * * * *